April 9, 1940.  O. HAMMER  2,196,966
WELL PIPE JOINT
Filed Oct. 24, 1939  2 Sheets-Sheet 1

Inventor
OTTO HAMMER
By Hazard and Miller
Attorneys

April 9, 1940.　　　O. HAMMER　　　2,196,966
WELL PIPE JOINT
Filed Oct. 24, 1939　　　2 Sheets-Sheet 2
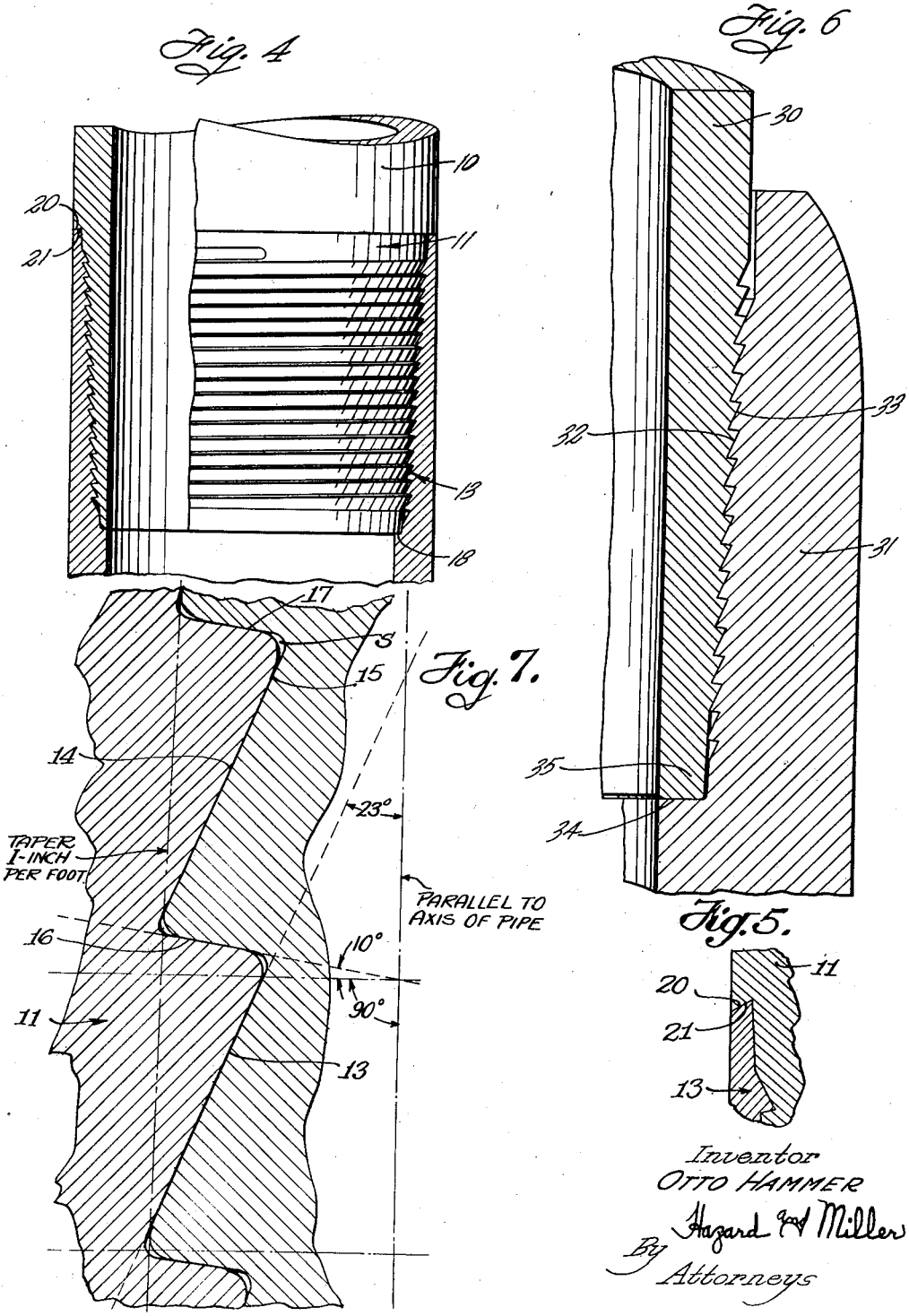
Inventor
OTTO HAMMER
By Hazard and Miller
Attorneys Patented Apr. 9, 1940

2,196,966

UNITED STATES PATENT OFFICE 2,196,966

WELL PIPE JOINT

Otto Hammer, Whittier, Calif., assignor to Security Engineering Co., Inc., Whittier, Calif., a corporation of California Application October 24, 1939, Serial No. 300,971

2 Claims. (Cl. 285—146)

This invention has to do with threaded connections between pipe sections such as are used on sections of well pipe used for casing, liners, and tubing in oil wells.

The invention has been primarily designed for connecting sections of casing, liner, or tubing having so-called flush joints wherein a pin is formed on the end of one section which is screwed into a box formed on the end of the other section, the arrangement being such that the joint is substantially flush both internally and externally of the pipe. Tests have indicated, however, that the advantages of the present invention are such as to adapt it not only to the use of flush joint constructions but for use in all types of threaded connections whether flush joint, upset, or collared.

In oil field work the threads on the ends of the pipe sections used to make up casing, liner, tubing, and the like are subjected to very severe abuse, when the sections are assembled together. Oil well drilling equipment is necessarily heavy and sturdy to meet the demands placed upon it and heavy articles, such as sections of casing and tubing, cannot be handled and assembled in a well drilling derrick with the ease and precision possible in other branches of industry. The threads used on tubing, casing, and liner sections which are to be assembled and lowered into an oil well are subjected to great danger of becoming damaged on assembling the sections together. They are also subjected to the danger of being overstressed. Sections of flush joint casing, tubing, and the like are usually assembled together in an oil well drilling derrick by having the lower section suspended from the rotary table with its box positioned uppermost. The upper section which is to be assembled therewith is lifted and vertically lowered onto the lower section so that the pin thereon enters the box. The insertion of the pin into the box in this manner is generally referred to as "stabbing," and when the upper section is "stabbed" into the lower section the upper section is then rotated relatively to the lower section to tighten up the joint. The stabbing of the usually tapered pin on the upper section into the box of the lower section is very apt to cause injury to the threads on the two sections so that, although the threads as originally designed and formed might have produced a highly efficient joint, injury of the threads cause it to be weakened.

Considerable damage is done to threads of casing, tubing, and liner sections by cross-threading. Thus, if the upper section is not maintained in vertical alignment with the lower section, upon the stabbing of the pin into the box there is danger of the threads becoming crossed on tightening up the joint resulting in their injury.

It is desirable that a thread for use on pipe or tubing sections used in oil wells possess the following qualities:

(1) Simplicity in design so that the mating or complementary threads can, if necessary, be machined in field shops with a high degree of accuracy which will assure a highly efficient joint.

(2) The ability to resist abuse when the male section or pin is stabbed into the female section or box with the least possible opportunity of cross-threading.

(3) A high joint efficiency or an ability to assume and withstand maximum tension, compression, bending, and torsion loadings.

(4) The ability of being leakproof under ordinary operating conditions.

(5) The ability to withstand deformation or injury under repeated makeup and break loadings, that is the forces usually applied to tighten the pipe sections together and to disassemble them.

(6) The ability to completely make up and tighten the joint with only a comparatively few revolutions of the upper section relatively to the lower section.

It is an object of the present invention to provide a threaded connection for connecting pipe or tubing sections which will possess to a high degree all of the above desirable qualities. The thread employed in accordance with the present invention may be regarded as a modified type of buttress thread characterized by the fact that it has a relatively shallow thread root so as not to unnecessarily reduce the remaining wall thickness of the pipe on which it is cut.

A deep thread root by contrast cuts into the remaining metal of the wall thickness, thus weakening the pipe at the location of the threads. If the depth of the thread root is lessened by using smaller threads or an increased number of threads per inch, the joint is subject to the disadvantage that danger of cross-threading is materially increased and unnecessary labor must be expended in turning the upper section relatively to the lower section to tighten up the joint.

In accordance with the present invention the shape of the thread is materially modified so that the inclination of the faces of the threads is quite gentle, the angle formed by the faces of the threads with the axis of the pipe in the preferred form of construction approximating 23°. With such an arrangement, on stabbing the pin into the box each thread that mutually engages acts somewhat in the nature of a gently tapered pin entering a gently tapered hole, the action being such as to cause a centering and an aligning of the pin relatively to the box by the mutually engaged faces of the threads. In this way, danger of injury of the threads is largely eliminated. Also, danger of cross-threading is largely eliminated. The depth of the thread root even in very coarse threads is not great so that the pipe is not unnecessarily weakened where the threads are cut thus enabling the use of coarse threads which will require only a comparatively few revolutions of the pipe to make up and tighten the joint after the stabbing. A thread as thus designed possesses adequate tensile strength, when other factors such as the pitch of the threads and the original wall thickness on which the threads are cut are equal. Unreinforced, however, the thread designed in accordance with the present invention is considerably weaker in sustaining compression loadings due to the nature of the taper of the leading faces, in order to gain the advantages derived therefrom. In order to compensate for the reduced strength under compression loadings, I propose using mutually engageable shoulders capable of transmitting compression stresses and also torsional stresses and in this way I secure a joint strong in tension, strong in compression, adequately strong in bending and torsion, and one which is leakproof under all ordinary conditions. At the same time I secure the advantages of being able to stab the pin into the box without danger of injury or cross-threading and after the pin has been stabbed the joint may be made up with only a comparatively few revolutions of the pipe.

With the foregoing and other objects in view, which will be made manifest in the following detailed description and specifically pointed out in the appended claims, reference is had to the accompanying drawings for an illustrative embodiment of the invention, wherein:

Fig. 4 is a view similar to Fig. 3, but illustrating the joint as having been tightened or completely made up;

Fig. 5 is an enlarged detail in section illustrating the shoulders which mutually engage at the top of the box;

Fig. 6 is a partial view in vertical section illustrating the invention as having been applied to a joint employing a collar as distinguished from the joint illustrated in Figs. 1 to 5 wherein a flush type joint is disclosed; and Fig. 7 is an enlarged vertical section through a portion of the threads employed in the present invention.

In its preferred form the threaded connection embodying the present invention may be described as follows. In the case of flush joint casing, tubing, and the like, as shown in Figs. 1 to 5, the upper pipe section 10 has a pin generally designated at 11 formed on its lower end. The lower pipe section 12 has a box 13 formed on its upper end. It will of course be understood that in flush joint casing and tubing each section of pipe is equipped at its lower end with a pin and on its upper end with a box. For purposes of illustration, however, only the pin on the lower end of the upper section and the box on the upper end of the lower section have been shown.

Figure 1:
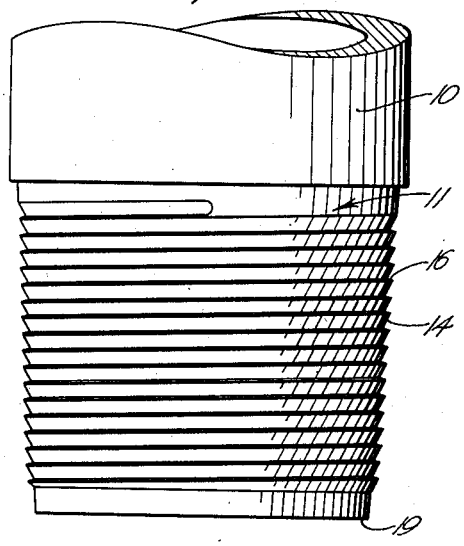
Figure 1 is a view in side elevation of the pin of an upper section of pipe such as may be used for casing, liner, tubing, and the like illustrating its pin as having been formed in accordance with the present invention.
Figure 2:
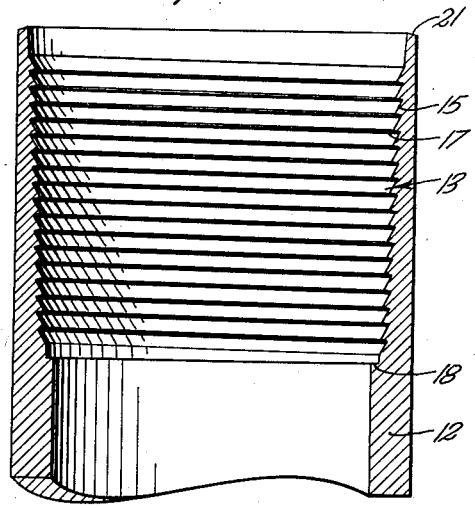
Fig. 2 is a vertical section through the upper portion of a lower section of pipe illustrating its box as having been formed in accordance with the present invention.
Figure 3:
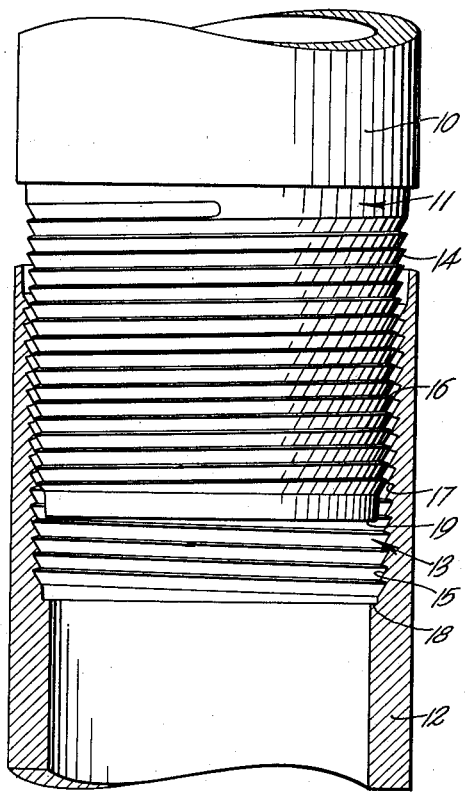
Fig. 3 is a view illustrating the pin shown in Fig. 1 as having been stabbed into the box shown in Fig. 2.

The screwthread employed is in the form of a modified buttress thread with the lead of the thread helix cut on a uniformly tapered surface. This taper is preferably 1" measured diametrically per foot of pipe length measured along the axis of the pipe. The cross-sectional thread shape is such that it presents a gentle taper on the leading faces of the threads, such taper being indicated at 14 on Fig. 1 and 15 on Fig. 2. The backs of the threads indicated at 16 on Fig. 1 and 17 on Fig. 2 are arranged on a very abrupt taper or may be described as highly inclined to the axis of the pipe. In this manner, on stabbing the tapered pin into the box as shown in Fig. 3, the gently tapered faces of the threads 14 and 15 which mutually engage slip over each other without danger of injury. The action is somewhat similar to inserting a gently tapered plug into a gently tapered hole with the result that the threads themselves tend to align the pin with the box so that it is virtually impossible to cross-thread.

I prefer to cut the threads on the pin and box by means of hobbing machines. The thread embodying the present invention is aptly suited to being formed in this manner. Tolerances may be accurately maintained. Because I prefer to cut the threads by means of hobbing machines the inclination of the abruptly tapered backs of the threads indicated at 16 and 17 are arranged at an angle of approximately 10° to a plane perpendicular to the axis of the pipe. Such angle is indicated on Fig. 7. This angle is selected primarily for the reason that an angle of more than 9° is required to allow for a hobb-cutter clearance in cutting the threads, otherwise there would be no particular minimum limitation on this angle except that it should be in the neighborhood of 10° so as to form abrupt surfaces capable of carrying tension loadings. The inclination of the buttress angle or the gently tapered surfaces is maintained at about 23° to the longitudinal axis of the pin or box such angle being indicated on Fig. 1.

The crests and roots of the threads are rounded with smooth radii to eliminate possibility of slivers forming when the threads are tightened together. In the preferred form of construction the roots of the threads of a pitch of eight threads per inch carry a radius of .005" while the crests of the threads carry a radius of .0099". The purpose of the difference is to obtain a small clearance space S between a thread crest and thread root to compensate or allow for machining errors and so that the threads will contact on their mating tapered surfaces 14, 15, 16, and 17 rather than at the roots and crests.

At the bottom of the threads on the box there is formed a shoulder 18 preferably arranged in a plane perpendicular to the axis of the pipe. This shoulder is engageable by the nose 19 of the pin which is shaped complementary thereto. At the base of the pin there is formed an undercut shoulder 20 (see Fig. 5), the undercut being arranged at approximately 60° to the axis of the pipe. The edge of the box indicated at 21 is formed complementary thereto. These mutually engageable shoulders on the pin and box are so formed as to simultaneously engage on tightening up the joint as indicated in Fig. 4. In practice, the variance limits are held at plus .0015" minus .000" on both the box and pin. Thus, a total tolerance of plus .003" could be obtained between the two thread limits which is within the double shouldering limits of the thread makeup.

The purpose of these double shoulder engagements at opposite ends of the threads are threefold, (1) to assist in transmitting compressive stresses; and (2), to form an effective seal to prevent leakage through the threaded connection; and (3), to assist in transmitting greater torque loads.

Because of the fact the crests and roots of the threads are rounded on different radii leaving a small clearance between them there is theoretically a small helical passage at the crest of each thread which would permit of fluid flow therethrough. This passage in actual practice is very apt to be filled with the conventional thread "dope" that is usually applied to the threads on assembling the pipe sections together. It is also possible for small amounts of foreign matter to clog these small helical passages. Regardless of whether the helical passages become filled or clogged the shouldered engagements at the ends of the threads form two additional positive seals that prevent leakage through the joint. The shoulder 18 at the bottom of the box is preferably a square shoulder or arranged at right angles to the pipe axis so that compressive stresses may be transmitted directly thereto from the end of the pin without danger of bulging or buckling the thin end or nose of the pin which is quite thin as compared with the pipe wall thickness. The purpose of the undercut shoulder 20 at the base of the pin is to prevent or retard expansion or bulging of the thin edge of the box when the pipe sections are tightly made up or assembled together. The length of the thread will, of course, vary slightly depending upon the available wall thickness on which to form the thread and shoulders.

A joint made up as above-described possesses the properties of enabling the pin to be stabbed into the box without danger of thread injury or cross-threading. Relatively coarse pitched threads may be employed. On tubing 3½" in diameter it is preferred to use a thread running eight threads per inch. When such threads are used only about six revolutions of pipe section 10 relatively to pipe section 12 are required to completely tighten and make up the joint following the stabbing. While the present construction lends itself to stabbing and quick makeup, it is nevertheless adequately strong.

When the invention was embodied upon tubing made of an aluminum alloy having an ultimate strength of 38,000 pounds per square inch, the tubing having a 3½" outside diameter and a 2.900" inside diameter the threads being eight threads per inch arranged on a taper of 1" per foot, it was found that the joint was capable of withstanding a tension loading of 68,300 pounds, this representing an efficiency of 58.9%. The same joint, when subjected to compression, was capable of withstanding an average load of 80,975 pounds. In tension, failure occurred in the pin about ½" from the upper shoulder 20. In compression, failure occurred by buckling adjacent both the outer and inner shoulders. This buckling appeared on the outside as a bulge or roll of metal about ¼" above the shoulder and extended completely around the tube. When the joint was subjected to bending it was found to be capable of withstanding an ultimate bending moment of 43,633 inch-pounds. Tests were made as to the leakage of this type of joint wherein the joint was subjected to an internal water pressure of 1800 pounds per square inch. Different makeup torques were applied and leakage investigated. On applying a makeup torque of only 1000 inch-pounds, water under this internal pressure dripped rapidly from the joint following as a rapid succession of drops but not as a full stream. On applying a makeup torque of 5000 inch-pounds, beads of water appeared around the joint and gradually collected until the drops fell, the rate of drip being one drop per five to ten seconds. On the application of 10,000 inch-pounds very small beads of water appeared at scattered points around the joint but there were no falling drops. On the application of a makeup torque from 12,000 to 20,000 inch-pounds no beads of water formed around the joint whatsoever under an internal pressure of 1800 pounds per square inch.

In Fig. 6, the invention is illustrated as having been embodied upon a collared type of joint wherein the upper section of tubing or casing is shown at 30 screwed into an external collar 31. The threads 32 and 33 on the casing or tubing and collar respectively have 10° backs of trailing faces and 23° leading faces as previously described. The thread is cut on the exterior of the tubing on a taper of 1" per foot of length of the tubing. In this form of construction the collar is provided with an internal shoulder 34 and the end of the tubing 35 forms a shoulder mutually engageable therewith. Thus, in this form of construction instead of having shoulders arranged at the top and bottom of the thread as in the flush joint form of construction illustrated in Figs. 1 to 5, a single pair of shoulders are provided between the casing section and the collar which mutually engage and assist in the transmission of compressive stresses.

The design of the thread above-described is that which is highly preferred. Some modifications thereof may be made within limits. Thus for example, although the taper on which the threads of the pin and box is above described as being 1" per foot of length based on diametrical measurements, slight changes may be made in this respect. I find that the taper may be as low as ⅞" per foot or as high as 1⅛" per foot. When these limits are exceeded some of the advantages of the preferred form are lost. Thus, if the taper is of 1¼" per foot it has been found that the taper is so steep that on pulling the joint in tension the pin section has a tendency to strip from the body of the box section before metal failure of the body of the pin occurs. Conversely, when the taper is reduced to ¾" per foot it is found that the taper is not sufficiently steep and there is danger of the threads cross-threading on stabbing the pin section into the box and furthermore, the crests of the threads of the pin ride on the crests of the threads of the box and will not allow the two threads to fall into engagement easily. For these reasons the taper is held between ⅞" and 1⅛" per foot and is preferably in the neighborhood of 1" per foot.

The inclination of the backs of the threads has been above-described as being 10° to the plane perpendicular to the axis of the pipe. This is selected in order to afford an adequate clearance for the hobbing machine cutter. The inclination may go as low as 9° or be as high as 15°. If the thread is cut other than by a hobbing machine the lower limit of 9° may be exceeded. The inclination of the faces of the threads has been described as being about 23° to the axis of the pipe. This inclination may vary between 22° and 25° to the axis of the pipe although a 23° inclination is preferable. At the root of each thread above-described there is a radius of .005", this being the radius employed for a thread of eight threads per inch. Under no circumstances should the radius be more than 25% of the thread height. The radius at the crest of the thread has heretofore been described as being .0099", this being the radius employed on a thread of eight threads per inch. This radius under no circumstances should exceed 27% of the thread height.

Some variation is permissible in the shape of the shoulder at the bottom of the box which is engaged by the nose or the end of the pin. This shoulder is preferably a square shoulder or one arranged in a plane at right angles to the axis of the pipe. This is preferred in the flush joint construction shown in Figs. 1 to 5 and in the collared construction illustrated in Fig. 6. The shoulder, if beveled so as to be inclined downwardly and inwardly, is apt to urge contraction of the nose or the end of the pin. If the shoulder is beveled or undercut so as to be inclined downwardly and outwardly its effect is to tend to cause the walls of the pin above the nose to buckle away from the interior of the box when subjected to very heavy stresses. For these reasons the shoulder is preferably a square shoulder.

In flush joint constructions the shoulders at the top of the threads are preferably downwardly and outwardly inclined as shown so as to maintain the thin top of the box snugly around the pin and to resist spreading of the box. It is conceivable however that such shoulders may be square shoulders or have other inclinations.

The advantages of the improved thread design are not necessarily restricted to the flush joint and collared joint as illustrated. Some of these advantages are retained if the thread is embodied in that type of joint illustrated in the patent to Frederick Stone and Albert L. Stone No. 2,006,520 issued July 2, 1935, and to other types of well pipe joints.

It will be noted with this construction that on stabbing the pin into the box more than half the length of the pin enters the box. More than half of the faces of the threads on the pin and box mutually engage merely on stabbing. The inclination of these surfaces is such that the faces of the threads on the pin engage the faces of the threads on the box and act in the nature of gently tapered elements entering gently tapered holes so as to tend to align the pin in the box without danger of injury to the threads or of cross-threading.

Various changes may be made in the details of construction without departing from the spirit or scope of the invention as defined by the appended claims.

I claim:

1. A well pipe joint embodying a tapered pin and box with mutually engageable threads cut thereon, the pin and box having mutually engageable shoulders capable of transmitting compression stresses in the direction of the axis of the pipe joint, the faces of the threads being inclined more closely to the axis of the pipe joint than the backs, the acute angle formed by the faces of the threads and the axis of the joint being not less than 22° nor more than 25°.

2. A well pipe joint embodying a tapered pin and a box with mutually engageable threads cut thereon, the taper on which the threads are cut being not less than ⅞" per foot and not more than 1⅛" per foot, the pin and box having mutually engageable shoulders capable of transmitting compression stresses in the direction of the axis of the pipe joint, the faces of the threads being inclined more closely to the axis of the pipe joint than the backs, the acute angle formed between the faces of the threads and the axis of the joint being approximately 23°.

OTTO HAMMER.